(12) United States Patent
Johns

(10) Patent No.: US 8,683,710 B2
(45) Date of Patent: Apr. 1, 2014

(54) TAPE MEASURE TOOL WITH LANYARD

(76) Inventor: Michael Johns, Hampton, VA (US)

( * ) Notice: Subject to any disclaimer, the term of this patent is extended or adjusted under 35 U.S.C. 154(b) by 43 days.

(21) Appl. No.: 13/606,968

(22) Filed: Sep. 7, 2012

(65) Prior Publication Data

US 2013/0055578 A1 Mar. 7, 2013

Related U.S. Application Data

(60) Provisional application No. 61/532,004, filed on Sep. 7, 2011.

(51) Int. Cl.
 *G01B 3/10* (2006.01)
(52) U.S. Cl.
 USPC .................................. 33/760; 33/770
(58) Field of Classification Search
 USPC ............ 33/759, 760, 764, 767, 768, 769, 770
 See application file for complete search history.

(56) References Cited

U.S. PATENT DOCUMENTS

| | | | | |
|---|---|---|---|---|
| 4,228,589 A | * | 10/1980 | Chemay | 33/759 |
| 4,976,037 A | * | 12/1990 | Hines | 33/769 |
| 5,815,873 A | * | 10/1998 | Jones | 33/760 |
| 6,370,790 B1 | * | 4/2002 | Stenger | 33/770 |
| 6,382,490 B1 | * | 5/2002 | Divincenzo | 224/681 |
| 7,125,145 B2 | * | 10/2006 | Gardiner et al. | 362/253 |
| 7,173,197 B1 | * | 2/2007 | Kasperek | 33/772 |
| 7,331,116 B1 | * | 2/2008 | Johnston et al. | 33/764 |
| 8,033,029 B2 | * | 10/2011 | Johnston et al. | 33/414 |
| 2004/0016058 A1 | * | 1/2004 | Gardiner et al. | 7/119 |
| 2007/0045010 A1 | * | 3/2007 | Kasperek | 33/772 |
| 2009/0106909 A1 | * | 4/2009 | Tyers | 7/118 |
| 2009/0158606 A1 | * | 6/2009 | Johnston et al. | 33/414 |
| 2010/0080087 A1 | * | 4/2010 | Shupp | 33/355 R |
| 2010/0163500 A1 | * | 7/2010 | Megow | 33/760 |
| 2012/0275144 A1 | * | 11/2012 | Foster | 33/758 |
| 2013/0055578 A1 | * | 3/2013 | Johns | 33/760 |

\* cited by examiner

*Primary Examiner* — Yaritza Guadalupe-McCall
(74) *Attorney, Agent, or Firm* — Duncan G. Byers; Byers Law Group

(57) ABSTRACT

A retractable tape measuring device comprising a single housing in which are two spools. A first spool is utilized for a flexible, retractable tape measure. A second spool is utilized for a retractable safety lanyard. The opening for the safety lanyard is on the narrow face of the device opposite the opening for the tape measure. The lanyard may be used to secure the device to clothing, other tools and devices, or to fixed structures.

3 Claims, 5 Drawing Sheets

TAPE MEASURE TOOL WITH LANYARD

This U.S. Patent Application claims the benefit of U.S. Provisional Patent Application No. 61/532,004 for Tape Measuring Tool With Lanyard, filed on Sep. 7, 2011.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The present invention relates a tethering mechanism for use with useful articles such as tools. More particularly, the present invention pertains to an adjustable length cable for securing a tape measuring device to a user that allows for the use of the tool without detaching the cable from the user.

Hand tools such as tape measuring devices, small meters, hammers, levels, nail guns, caulking guns and other similar equipment are used in environments where, if they are accidentally dropped either while being used or carried by someone working with the tool they are difficult to retrieve and may actually damage the tools and equipment below. More seriously, a dropped tool may strike and seriously injure any person struck by the falling tool. Thus, a tool holding and tethering systems is needed to secure a tool to an individual while allowing the individual to use the tool with the tool still attached in some manner to the individual.

SUMMARY

According to an exemplary embodiments, the present invention includes a safety cable for holding and securing tool to an individual, such as construction worker, roofer, home repair contractor and building, or a homeowner so that the tools are not inadvertently or accidentally dropped on the ground or dropped on and striking an individual thus damaging the tools and, more significantly, injuring the individual.

The safety cable (lanyard) of the present invention includes a flexible cable that has a first end secured to the individual or workman and a second distal end attached to a tool. The first end includes an open and close chain link that can be secured to and released from an article of clothing, such as the individual's belt or a work belt of a construction worker. For example, the first end of the safety cable may be attached to a D-ring. The D-ring provides the attaching, hooking, clipping means to the article of clothing. The distal end of the cable terminates with a configuration that is attachable to the tool that can be a tape measuring device, a power drill a circular saw, a level, a square, a hammer, a nail gun, a caulking gun, a cell phone, a computer device, a media device or the like. The length of the cable is adjustable in that when the tool is not being used, the safety cable is retracted into a portion of the housing of the tool thus taking up a substantial length of the safety cable thereby preventing the cable—and the tool secured to the distal end thereof—from freely swaying, dangling and getting caught in equipment or structure to the detriment and danger of the worker. When the worker desires to use the tool, he or she simply exerts a push or pull on the tool, like pulling on the opposite end of a tape measuring device, to release a desired amount of the safety cable, and thus can maneuver, position and use the tool in a free and unencumbered manner.

It is an objective of the present invention to provide a safety cable for holding tools that is lightweight, durable and capable of holding and securing various types of tools to the worker.

It is another objective of the present invention to provide a safety cable for holding tools that prevents the tools from falling when the worker is on a ladder, roof, or standing at ground level.

It is yet another objective of the present invention to provide a safety cable for holding tools that provides safety for the people and objects below the work area of the worker to which the safety cable and the tool is secured.

It is still yet another objective of the present invention to provide a safety cable for holding a tape measuring device that enhances the use of the tape measuring device.

DESCRIPTION OF THE DRAWINGS

The above and other exemplary embodiments, objects, uses, advantages, and novel features are more clearly understood by reference to the following description taken in connection with the accompanying figures wherein.

The appended drawings illustrate exemplary configurations of the disclosure and, as such, should not be considered as limiting the scope of the disclosure that may admit to other equally effective configurations.

DESCRIPTION OF THE INVENTION

The word "exemplary" is used herein to mean "serving as an example, instance, or illustration." Any configuration or design described herein as "exemplary" is not necessarily to be construed as preferred or advantageous over other configurations or designs.

This invention now will be described more fully hereinafter with reference to the accompanying drawings, in which exemplary embodiment are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover all statement herein reciting embodiments of the invention, as well as specific examples thereof are intended to encompass both structural and functional equivalents thereof. Additionally, it is intended that such equivalents include both currently known equivalents as well as equivalents developed in the future (i.e., any elements developed that perform the same function, regardless of structure).

Thus for example, it will be appreciated by those of ordinary skill in the art that the diagrams, schematics, illustrations, and the like represent conceptual views or perspective views illustrating some of the tape measure with lanyard device and methods embodying this invention. The functions of the various elements shown in the figures may be provided through the use of materials that may vary in shape, attachment, size, and other physical features. Those of ordinary skill in the art further understand that the exemplary device and/or methods described herein are for illustrative purposes and thus, are not intended to be limited to any particular named manufacturer or other relevant physical limitation (e.g., color of the material).

Illustrated in the accompanying figures is a safety line or cable for holding and securing hand tools such as a tape measuring devices, a communications or media device, a power drill, a caulking gun, a levels and the like to the individual whether the individual. More specifically, the safety cable tethers the tool, such as the tape measuring device to an article or portion of the worker's clothing thereby preventing the tool from falling or dropping to the ground damaging or breaking the tool. The safety cable prevents injury to anyone situated beneath the worker and also helps to reduce liability for the individuals and/or companies employing the individual.

Figure 1:
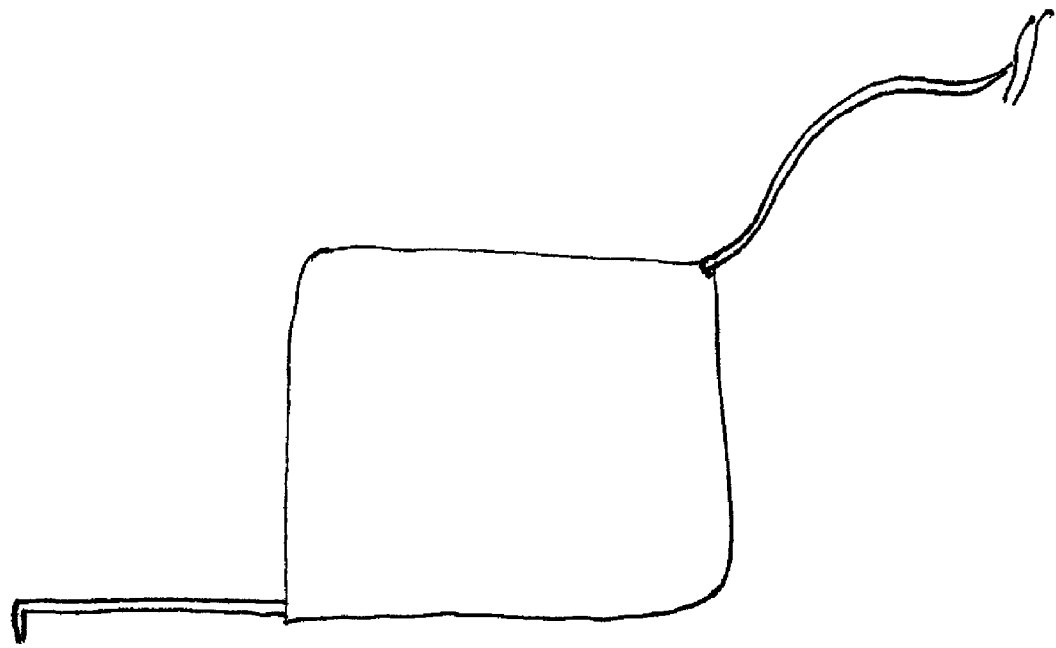
FIG. 1 is a perspective view of a side view of a tape measuring tool with an adjustable lanyard according to exemplary embodiments of this invention.
Figure 2:
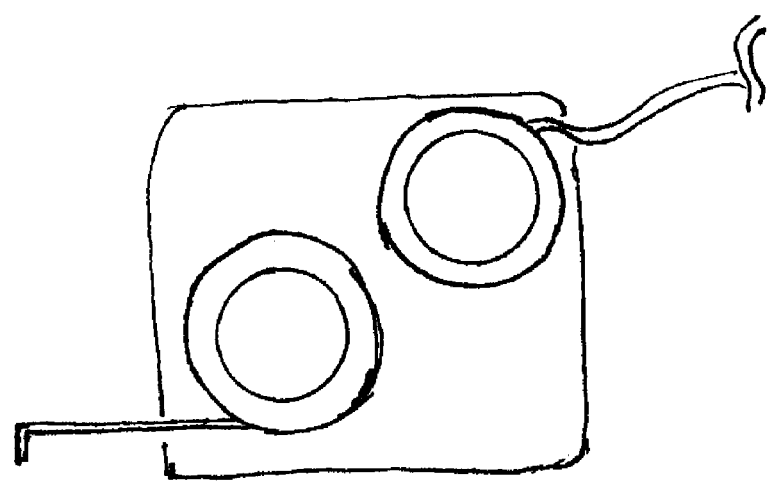
FIG. 2 is a perspective, cut-away view of the tape measuring tool of FIG. 1.

As shown in FIGS. 1 and 2, a lanyard includes a length of cable that has a first end attachable to the individual, more specifically to a belt of the individual. The cable also includes an opposite second distal end that is retractably, securable to the tool. The first end of the cable may further include an attachable and releasable means for securing the first end of the cable to the worker's belt, so that if the safety cable becomes tangled or encumbers the ability of the individual to safely move and work, the safety cable can be quickly and easily removed with minimal effort by the individual.

FIG. 1 illustrates an exemplary embodiment of a tape measuring device with an adjustable safety cable that includes a housing having a tape opening, a retractable measuring tape, a lanyard opening, and a retractable lanyard. This embodiment may further includes a lock mechanism for the retractable tape, a lock mechanism for the retractable lanyard, a first and a second bumpers, an end stop that is mounted on the tape's free end and an end stop that is incorporated into an end of the lanyard (i.e., a D-ring).

Similar to prior retractable tape measures the tape opening is in the front portion of the tape's housing. However, contrary to prior retractable tape measures, there is a second opening for the retractable lanyard. The housing, bumpers, and other components of the tape measuring device with an adjustable safety made of fabrics plastics metals light woods and/or composites (e.g., cardboard) and other natural and man-made products. According to FIG. 1, the housing is a substantially rectangular framework having four corners. Alternate shapes may be used, such as circular, elliptical, and other geometric as well as non-geometric shapes.

The tape's housing is formed of two half casing elements that may be secured together by screws in a known manner. The two halves of the casing define a front portion, a top portion, a back portion, and a bottom portion. In order to lock the tape in an extended position, a tape lock mechanism is preferably located in either the housing's front or top portions. In order to lock the lanyard in an extended position, a lanyard lock mechanism is preferably located in either the housing's back or bottom portions. With a front portion location, the lock mechanism, includes an actuator and a slide plate. The actuator may be pivotally mounted on a post between the casing halves. The actuator has an exposed surface which protrudes through an actuator opening in the housing's front portion. Pressure on this surface by a tape user moves the actuator between a first portion (the unlocked position) and a second position (the locked position).

The actuator includes a hook member that engages the slide plate and applies a force that causes it to slide up (to lock) and down (to unlock) within a path extending inwardly from the respective halves of the housing. Upon the application of an upward force on the actuator's exposed surface, the slide plate's free end moves upward along its defined path to engage the tape's bottom surface.

In order to cushion the impact of tape's end stop against the edges of the tape opening upon retraction of the tape, a top and a bottom bumper mechanism may be provided at the edges of the tape opening. In an exemplary embodiment, the bumper mechanism consists of a one-piece construction and are formed from a resilient material which can absorb the impact of the tape's end stop. A similar lock and bumper mechanism is used for the lanyard.

In describing these locking mechanisms, it should be recognized that many different mechanical motions and locations are possible. For example, rather than the actuator having a pivoting motion it could alternatively have a sliding motion along the housing's surface. Similarly, the locking mechanisms may be located on other portions of the housing.

The measuring tape and lanyard are each coiled within the housing about respective hubs with each inner distal end secured to the respective hub in any convenient manner. A respective coiled spring is located within each hub and is connected to a respective central shaft. Each coiled spring operates in the known manner to automatically retract the tape or the lanyard into the housing.

Figure 4:
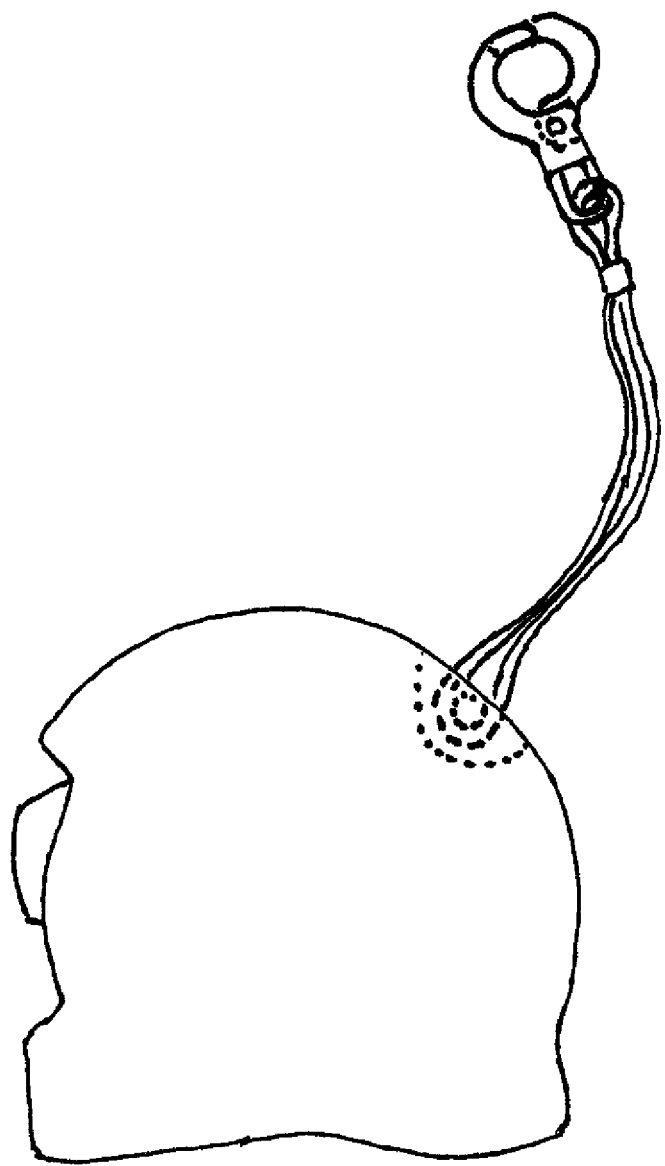
FIG. 4 is a perspective side view of an alternate tape measuring tool with an adjustable lanyard according to exemplary embodiments of this invention.
Figure 5:
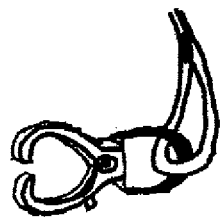
FIG. 5 is a perspective view of a clamping device used to attach the tape measuring tool of FIG. 4.
Figure 6:
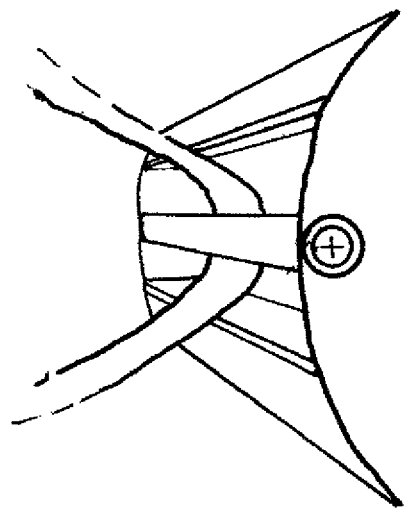
FIG. 6 is a more detailed perspective view of a surface of the tape measuring tool of FIG. 4 that shows details for attaching the lanyard in a recessed housing section having a retaining pin.

Still further, FIG. 4 shows an alternate tape measuring device that includes an adjustable lanyard having a removable clamp as best illustrated in FIG. 5 and a recessed housing area for attaching the lanyard and securing it about a pin.

Figure 7B:
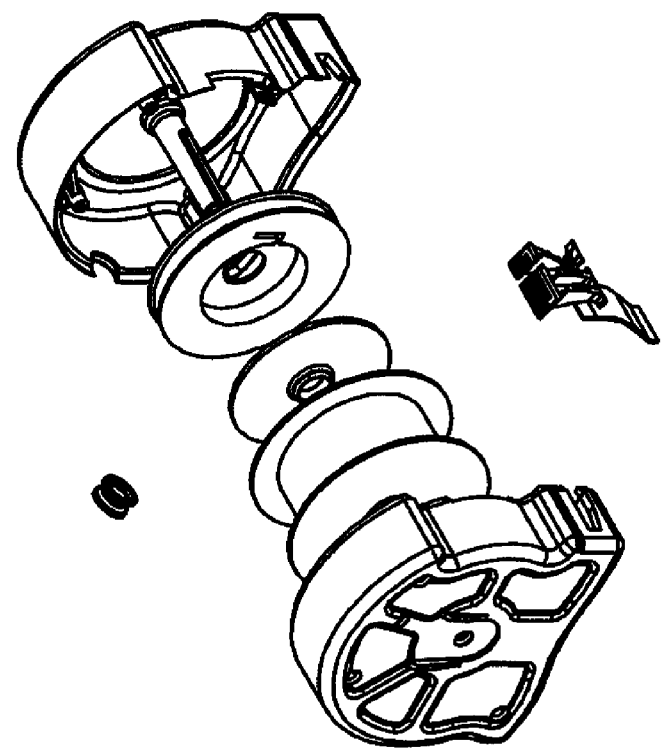
FIGS. 7A and 7B show exploded views of an embodiment of the present invention.
Figure 7A:
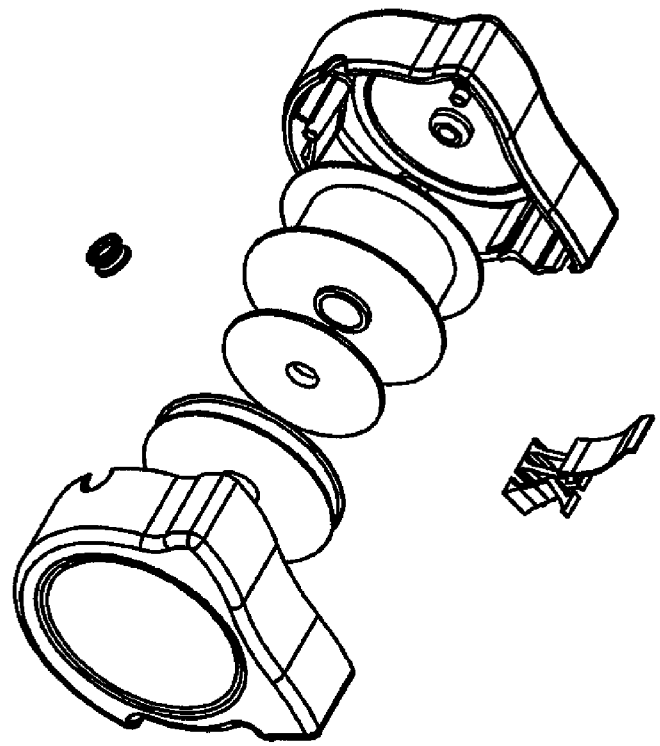

FIGS. 7A and 7B show an embodiment of the present invention wherein the measuring tape hub and the lanyard hub are positioned on the same central axis within the body of the measuring device. An embodiment of the locking device is also shown.

Figure 3A:
FIG. 3A is a perspective top view of an alternate tape measuring tool with an adjustable lanyard according to exemplary embodiments of this invention.
Figure 3B:
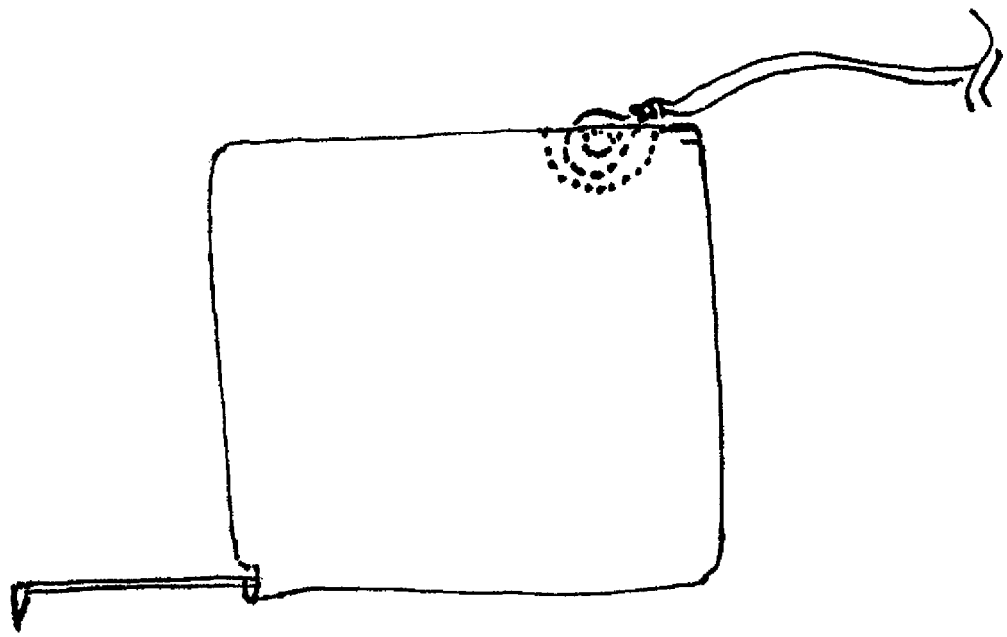
FIG. 3B is a perspective side view of the alternate tape measuring tool of FIG. 3.

Many modifications and other embodiments of the invention will come to mind to one skilled in the art to which this invention pertains having the benefit of the teachings presented in the foregoing descriptions and the associated drawings. For example FIGS. 3A and 3B illustrate that the second distal end of the lanyard may be fixed to a portion of the housing and not include the functionality to be retractable within the housing of the tool. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitations.

What is claimed is:
1. A tape measuring device comprising:
a housing with a first casing and a second casing element, the first casing and second casing elements being secured together;
the first casing and second casing elements when secured together defining a front portion, a top portion, a back portion, and a bottom portion;

the housing further comprising an actuator opening in the housing's front portion;

the housing containing a tape measure and first circular hub around which the tape measure is wound, the first circular hub rotatably attached to a solid axis extending between the first casing and the second casing elements;

an opening in the front portion of the housing through which the tape measure is extended out of and retracted into the housing, the end portion of the tape measure further comprising a tab preventing the tape measure from retracting completely into the housing;

a tape lock mechanism located within the housing, the lock mechanism comprising an actuator and a slide plate, the actuator being pivotally mounted on a post located between the casing halves, the actuator further comprising an exposed surface which protrudes through the actuator opening located within the housing's front portion;

the actuator being moveable within the actuator opening from a first position and a second position, the second position providing pressure on the tape measure protruding from the housing;

a lanyard lock mechanism located within the housing, the actuator further comprising a hook member that engages the slide plate, the hook member providing a force against the slide plate causing the actuator to slide up or down within a path defined by the actuator opening; and a lanyard securing means located on the outside portion of the housing, the lanyard securing means comprising a solid pin extended between the first casing element and the second casing element and a recessed portion defined by the first casing element and the second casing element, the solid pin disposed within the recessed portion and the lanyard attached around the solid pin.

2. The tape measuring device of claim 1 wherein the tape measuring device further comprises a second circular hub disposed within the housing around which the lanyard is wound, an opening in the housing through which the lanyard is extended out of and retracted into the housing, the second circular hub rotatable around an axis disposed within the housing, the second circular hub further mechanically affixed to a coiled spring that is affixed within the housing such that the resting position of the coil is with the lanyard retracted into the housing, the coiled spring providing force against the second circular hub so that the lanyard is mechanically retracted into the housing.

3. The tape measuring device of claim 2 wherein the second circular hub is rotatably mounted on the same fixed axis as the first circular hub but is not mechanically affixed to the first circular hub.

\* \* \* \* \*